Patented June 29, 1948

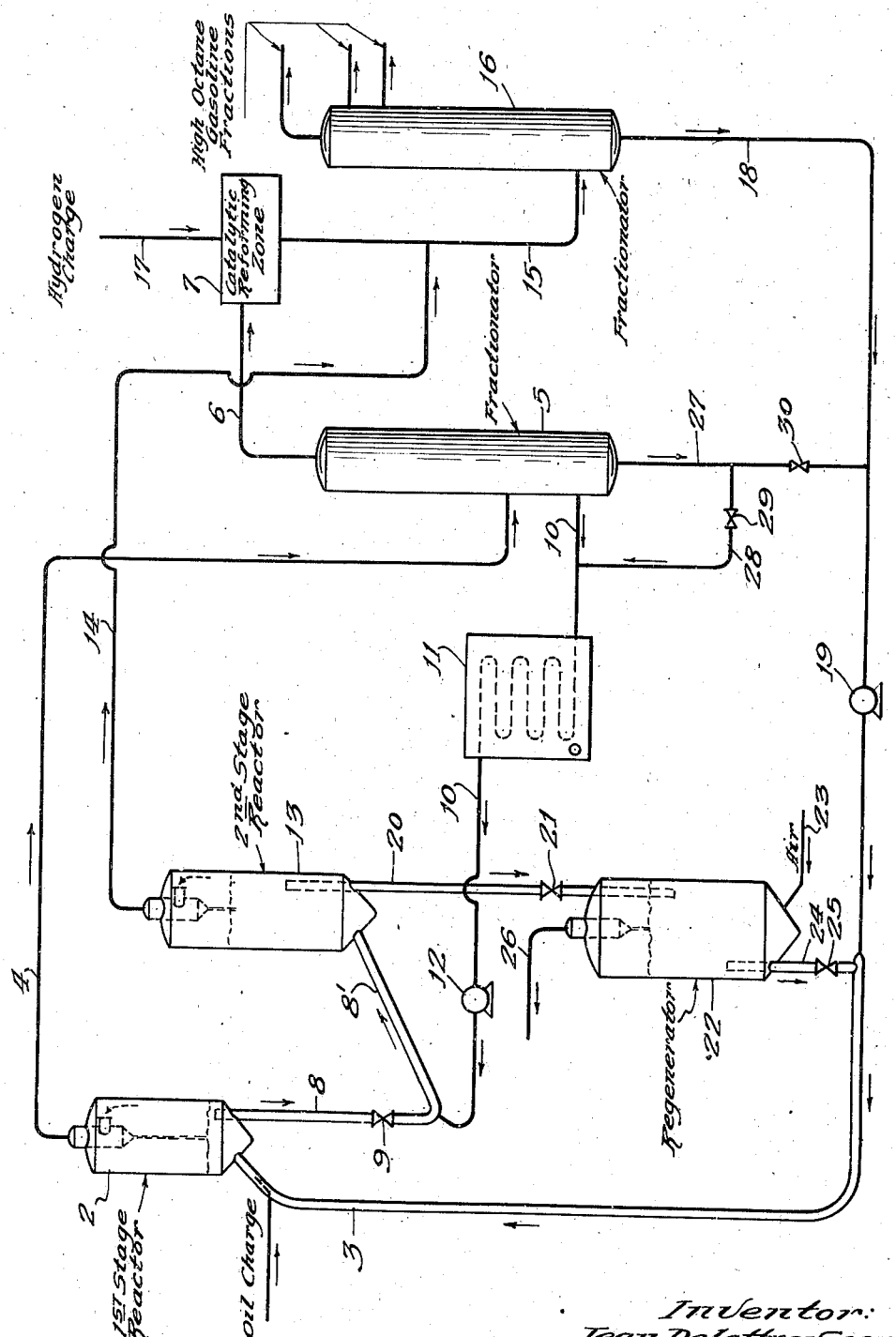

2,444,131

UNITED STATES PATENT OFFICE 2,444,131

CONVERSION OF HYDROCARBON OILS

Jean Delattre-Seguy, Washington, D. C., assignor to Universal Oil Products Company, Chicago, Ill., a corporation of Delaware Application March 1, 1946, Serial No. 651,292

4 Claims. (Cl. 196—52)

This invention relates to an improved process for the production of high octane number gasoline from a high boiling hydrocarbon charge wherein two-stage contacting of fluidized catalyst particles is employed, in combination with a catalytic reforming step, to produce optimum yields of a high grade fuel.

The principal object of this invention is to obtain a high quality gasoline from a heavy high boiling hydrocarbon charge in a system which comprises two stages of fluidized catalyst contact in combination with a catalytic reforming unit.

A further object of the invention is to use hot catalyst particles to eliminate the need of a thermal viscosity breaker unit for a crude oil charge, the crude charge being brought into contact with hot regenerated and fluidized catalyst particles in an initial contact zone in order to effect a mild cracking operation.

According to my invention a high boiling hydrocarbon oil, such as reduced crude, is subjected to a mild cracking or simulated viscosity breaking operation by a relatively brief contact time with hot fluidized particles of fine sub-divided catalyst in a first stage reactor, wherein the charge is converted primarily to gas oils, naphthas and low grade gasoline. The conversion products from the first stage of contact are separated from the catalyst particles and directed to a fractionation column, from which the lighter fractions are withdrawn and passed to a catalytic reforming process, while the heavier gas oil fractions are passed to a second reactor for the second stage contact with the catalyst particles. The second stage reactor receives all of its catalyst charge in a dense fluidized phase directly from the first stage reactor. The catalyst particles, which are only partly contaminated by their short time contact with the reduced crude charge are thus used further, prior to regeneration, to convert the recycled gas oil fraction within the second reactor. The conversion products from the second stage reactor are passed to a second fractionator together with the reformed products of improved quality from the catalytic reforming zone. The contaminated catalyst particles from the second stage reactor are then passed to a catalyst regenerator wherein the contaminating carbonaceous matter is removed by oxidation, while in a fluidized state of hindered settling. The regenerated catalyst particles are then returned to the first stage reactor for reuse in the continuous process. The bottoms or heavy fractions from each of the fractionators may be returned to the first stage reactor together with the regenerated catalyst and in the preferable operation of the unit, these vaporized fractions will be employed as an aerating medium for returning or recycling the regenerated catalyst in a fluidized phase upwardly through the vertical riser to the first reactor.

The advantage of the present arrangement is that a crude oil may be charged directly to the fluid catalyst conversion unit. Normally, a hydrocarbon crude is subjected to a thermal conversion or viscosity-breaking operation, from which a separated gas oil fraction is used for the charge to a fluid catalytic cracking unit. By two stages of fluidized catalyst contact in combination with a reforming operation, it is made possible to obtain high grade gasoline in a direct manner without thermal, non-catalytic conversion of the crude oil. A further advantage is found in the flow and arrangement of contact chambers, whereby only one regenerator is employed for reactivating the catalyst particles, since the particles are passed serially from one contact zone to the other.

In the operation of the fluidized portion of the system comprising this invention, the reduced crude is charged to the first reactor together with hot regenerated and fluidized catalyst, at a relatively high space velocity, space velocity being the term applied to the ratio of oil to catalyst, normally expressed in pounds of oil per hour to pounds of catalyst in the reactor. It is not desired to obtain a high conversion of the charge in this initial contact zone, nor should the catalyst be allowed to become badly contaminated and thus become inactive for deep cracking of gas oil fractions in the second contact zone. The first reactor may be operated at about zero catalyst level, which means that the oil charge may be contacted with the catalyst within the charge conduit or entrance portion of the chamber only, with little additional contact through the chamber and with no or little dense phase bed depth maintained above the catalyst withdrawal outlet. A short time contact is all that is necessary to effect the desired limited conversion of the crude. The products of conversion, which will be low grade gasoline, naphthas, etc., are fractionated as previously noted, with the lighter products being passed to a catalytic reforming zone and the heavier fractions being recycled to the fluidized units. The second stage reactor receives all of its catalyst charge directly from the first, and operates to crack a portion of the recycled fractions into high grade motor fuels that are blended with the reformed products. The space velocity to the second reactor may be much lower than in the first, operating with a longer time of contact between the hydrocarbon and catalyst, in order to insure production of the optimum yield of high quality motor fuel.

Any of the well-known finely divided solid catalysts may be employed in the fluidized catalytic cracking zone. Such catalysts may comprise silica composited with oxides of alumina, magnesia, or the like which are capable of actively promoting catalytic cracking. The catalytic reforming process may be of the fluid type or of the fixed bed type wherein hydrocarbons may be catalytically dehydrogenated or catalytically cyclized in the presence of hydrogen to form aromatic hydrocarbons boiling in the gasoline range and having a high octane number. The catalyst employed in the reforming zone may be any of the well-known types comprising principally magnesia or alumina.

The accompanying drawing shows a diagrammatic flow diagram which illustrates the operation and the relationship of the various steps of the process. No novelty is claimed herein for any of the conversion steps per se, but invention is believed to reside in the cooperative manner in which the steps are herein combined to achieve the desired results.

Referring now to the drawing, a high boiling hydrocarbon, such as crude oil or a reduced crude, is charged through line 1 to the reactor 2 wherein it is mixed and contacted in a state of hindered settling, or fluidization, by small sub-divided catalyst particles which are charged to the reactor 2 through the riser line 3. Fluidized contact and hydrocarbon conversion within fluid catalytic cracking units is now well-known to the art and detailed explanation should be unnecessary. In the present hydrocarbon conversion system comprising this invention, the hot regenerated catalyst is contacted for a short period only in the reactor 2. A high space velocity, of the order of 5 to 10, is thus used to effect a light cracking and viscosity breaking of the crude charge, as well as insure a minimum of carbonaceous deposit and contamination on the catalyst particles. The conversion products from reactor 2 are separated from the catalyst particles and passed by way of line 4 to fractionator 5 wherein the product is fractionated to provide low grade gasoline fractions, naphtha, gas oil fractions, and heavy bottoms material. The low grade gasoline and naphtha fractions are removed from fractionator 5 by way of line 6 and directed to a catalytic reforming zone 7.

In the catalytic reforming zone 7, a hydrocatalytic process is carried out in the presence of catalyst and hydrogen containing gases or in the presence of a hydrogen donor fluid such as naphthenic oil. The hydrogen containing gas or donor is charged to the catalytic reforming zone 7 by way of line 17. The hydrocarbon charge is converted to a high percentage of aromatic hydrocarbons within the catalytic reforming zone.

The catalyst from reactor 2 is removed in a dense fluid phase through standpipe 8 and control valve 9 and is directed to reactor 13 wherein the catalyst particles are contacted with the gas oil fractions from the fractionator 5. The gas oil from fractionator 5 is withdrawn through line 10 and passed through a heater 11 and through pump 12 and is charged to the reactor 13 through line 8, becoming mixed with the catalyst charge in line 8. A space velocity of from 0.5 to 5 may be used in this second reactor for a longer contact time is necessary to obtain a relatively high conversion to high quality motor fuel products. The conversion products from reactor 13 are withdrawn by way of line 14 and combined in line 15 with the catalytically reformed products from zone 7. The combined products in line 15 are passed to a second fractionator 16 wherein final fractionation may be carried out to obtain high octane gasoline, and intermediate fractions which may be blended to make motor grade gasoline. The bottoms from fractionator 16 are withdrawn through line 18 and through pump 19 being returned to the first stage reactor 2 by way of the regenerated catalyst riser line 3.

Contaminated catalyst from the second stage reactor 13 is passed by way of standpipe conduit 20, having a control valve 21, to the regenerator 22. The contaminated catalyst in regenerator 22 has the deleterious carbonaceous matter removed or burned off by the addition of an oxidizing gas, such as air, charged through line 23 to the regenerator 22. The gas maintains the catalyst in a state of fluidization or hindered settling, such that efficient burning of contaminants and regeneration of the catalyst is obtained prior to its withdrawal. The regenerated catalyst is passed through line 24, having control valve 25, to the lower end of riser line 3. Combustion or flue gases are separated from the catalyst particles in the upper portion of the regenerator 22 and are discharged through line 26. Bottoms from the fractionator 5 may be recycled to the second stage reactor 13 by way of lines 27 and 28 or to the first stage reactor 2 by way of lines 27, 18 and 3. The valves 29 and 30 are provided in lines 28 and 27 respectively so that the flow may be made to either reactor. In another operation of the unit, the bottoms material from the fractionator 5 may be divided, with a portion of heavy material passing to each of the reactors 2 and 13.

The unit may be operated without heater 11, however, the additional heat given the charge material for the catalytic cracking operation within the second stage reactor 13 is advisable to obtain optimum conversion yields. The regenerator 22 may be operated within the range of 1000–1400° F., thus the recycled bottoms from line 18 will be vaporized upon contact with the regenerated catalyst being withdrawn by way of line 24 and line 3, and may then serve as an aerating medium in line 3 to effect transfer of catalyst particles in a light fluidized phase to reactor 2. The first stage reactor 2 is operated within a catalytic conversion temperature range which may vary from 850° to 1050° F., while the second stage reactor 13 receives the catalyst at a somewhat lower temperature after its initial contact in the first reactor, operating within the range of 800° to 1000° F. Pressures throughout the unit are from a low superatmospheric pressure to 500 pounds per square inch gage, the pressures varying from point to point as necessary to maintain the desired fluid and hydraulic flow throughout the system.

I claim as my invention:

1. A process for producing high octane gasoline which comprises passing a reduced crude together with a stream of sub-divided solid cracking catalyst to a first stage reactor, subjecting said crude to short time thermal and catalytic cracking within said reactor, separating the conversion products from catalyst particles within said reactor, passing contacted catalyst from said first stage reactor to a second stage reactor, passing said conversion products to a fractionator and separating said conversion products into naphtha, gas oil and bottoms fractions, supplying the light naphtha fraction from said fractionator to a catalytic reforming step, passing the gas oil fraction from said fractionator to said second stage reactor for longer contact with said catalyst, withdrawing the conversion products from said second stage catalyst reactor and charging said products in combination with the reformed fraction from said reforming step to a second fractionator, withdrawing high octane number gasoline from said second fractionator, passing contaminated catalyst from said second stage reactor to a catalyst regenerator, burning deleterious deposits from said catalyst particles in said regenerator, withdrawing regenerated catalyst from said regenerator for fluidized transfer to first said reactor, combining the bottoms material from each of said fractionators with said regenerated catalyst and passing the mixture to the first said reactor to be charged with said reduced crude.

2. A process for the conversion of heavy hydrocarbon oil containing residual fractions of petroleum which comprises subjecting said oil to a mild cracking treatment in contact with hot, freshly regenerated cracking catalyst at a relatively high space velocity, separating the resultant conversion products from the catalyst and fractionating the same to recover a gas oil fraction therefrom, contacting said gas oil fraction with the separated catalyst at a cracking temperature and at a lower space velocity than is maintained in said mild cracking treatment, whereby to effect a more drastic cracking of the gas oil fraction into gasoline, separating the catalyst from the products of said more drastic cracking and regenerating the same by burning carbonaceous matter therefrom, and supplying the hot regenerated catalyst to said mild cracking treatment.

3. The process as defined in claim 2 further characterized in that the space velocity in said mild cracking treatment is from about 5 to about 10 and the space velocity in the more drastic cracking treatment is from about 0.5 to about 5.

4. A process for the conversion of heavy hydrocarbon oil containing residual fractions of petroleum which comprises subjecting said oil to a mild cracking treatment in contact with hot, freshly regenerated cracking catalyst at a relatively high space velocity, separating the resultant conversion products from the catalyst and fractionating the same to recover a gas oil fraction and a bottoms fraction therefrom, returning the bottoms fraction to the mild cracking treatment, contacting said gas oil fraction with a separated catalyst at a cracking temperature and at a lower space velocity than is maintained in said mild cracking treatment, whereby to effect a more drastic cracking of the gas oil fraction into gasoline, separating the catalyst from the products of said more drastic cracking and regenerating the same by burning carbonaceous matter therefrom, and supplying the hot regenerated catalyst to said mild cracking treatment.

JEAN DELATTRE-SEGUY.

REFERENCES CITED

The following references are of record in the file of this patent:

UNITED STATES PATENTS

| Number | Name | Date |
|---|---|---|
| 2,271,645 | Kanhofer I | Feb. 3, 1942 |
| 2,300,031 | Benedict | Oct. 27, 1942 |
| 2,312,445 | Ruthruff | Mar. 2, 1943 |
| 2,379,159 | Kanhofer II | June 26, 1945 |
| 2,399,224 | Haensel et al. | Apr. 30, 1946 |